US009624560B2

(12) United States Patent
Gonzalez et al.

(10) Patent No.: US 9,624,560 B2
(45) Date of Patent: Apr. 18, 2017

(54) RECOVERY OF RESIDUAL COPPER FROM HEAP LEACH RESIDUES

(75) Inventors: José Alberto Gonzalez, Fruitvale (CA); Christian Rubén Jara Heck, La Serena (CL); Hector M. Lizama, Trail (CA)

(73) Assignee: TECK RESOURCES LIMITED, Vancouver, BC (CA)

( * ) Notice: Subject to any disclaimer, the term of this patent is extended or adjusted under 35 U.S.C. 154(b) by 267 days.

(21) Appl. No.: 13/160,107

(22) Filed: Jun. 14, 2011

(65) Prior Publication Data

US 2011/0303051 A1    Dec. 15, 2011

Related U.S. Application Data

(60) Provisional application No. 61/473,408, filed on Apr. 8, 2011, provisional application No. 61/355,085, filed on Jun. 15, 2010.

(51) Int. Cl.
    C22B 60/02    (2006.01)
    C22B 11/00    (2006.01)
    C22B 15/00    (2006.01)

(52) U.S. Cl.
    CPC ...... *C22B 15/0002* (2013.01); *C22B 15/0065* (2013.01); *C22B 15/0071* (2013.01); *Y02P 10/236* (2015.11)

(58) Field of Classification Search
    CPC ............ C22B 15/0071; C22B 15/0084; C22B 3/0005; C22B 15/0002; C22B 15/0063; C22B 15/0065; C22B 23/0415; C22B 23/043; C22B 11/04; C22B 11/042; C22B 3/04; C22B 3/08; C22B 23/0407;

(Continued)

(56) References Cited

U.S. PATENT DOCUMENTS 4,256,706 A * 3/1981 Heinen et al. .................. 75/747
5,332,559 A * 7/1994 Brierley et al. ................ 423/27

(Continued)

FOREIGN PATENT DOCUMENTS

CA    2 391 091    10/2009
CL    1069-02    5/2002

OTHER PUBLICATIONS

García and Politis, "High Grade Leaching of Tretared Ores in Anglo American Chile—Mantos Blancos Division," presented by Marcelo Argandoña at Hydroprocess 2008, II International Workshop on Process Hydrometallurgy, May 16, 2008, Santiago, Chile (partial English translation provided).

(Continued)

*Primary Examiner* — Scott Kastler
*Assistant Examiner* — Michael Aboagye
(74) *Attorney, Agent, or Firm* — Seed IP Law Group LLP

(57) ABSTRACT

A process for recovering copper from heap leach residues, the process comprising treating heap leach residues to provide treated heap leach residues providing improved permeability of a heap of the treated heap leach residues, and leaching the heap of the treated heap leach residues with a leaching solution. Treating the heap leach residues includes: a) blending the heap leach residues with additional material to provide a blend; or b) agglomerating the heap leach residues; or c) both blending the heap leach residues with additional material and agglomerating.

39 Claims, 16 Drawing Sheets

(58) Field of Classification Search
CPC .......... C25C 1/12; Y02W 30/54; E21C 41/16;
Y02P 10/236
USPC ......... 75/711, 743, 744, 712, 718, 731, 732,
75/398; 266/168, 170; 205/580–583;
423/23, 24, 27
See application file for complete search history.

(56) References Cited

U.S. PATENT DOCUMENTS

| | | | | |
|---|---|---|---|---|
| 5,668,219 | A * | 9/1997 | Polizzotti et al. | 525/294 |
| H2005 | H * | 11/2001 | Winby et al. | 423/27 |
| 6,576,041 | B2 * | 6/2003 | Cole | C22B 3/02 |
| | | | | 205/291 |
| 6,926,753 | B2 * | 8/2005 | Faine et al. | 75/712 |
| 8,070,851 | B2 * | 12/2011 | Muller et al. | 75/743 |
| 2006/0248983 | A1 * | 11/2006 | Hunter | C22B 3/08 |
| | | | | 75/743 |
| 2007/0264703 | A1 * | 11/2007 | Plumb | C12P 3/00 |
| | | | | 435/262 |
| 2008/0241024 | A1 * | 10/2008 | Riekkola-Vanhanen | C22B 15/0008 |
| | | | | 423/27 |
| 2010/0282024 | A1 * | 11/2010 | Moroney | C22B 1/2406 |
| | | | | 75/743 |

OTHER PUBLICATIONS

Yañez, "Lixiviación en División Radomiro Tomic," presentation at I Coloquio de Operadores de Plantas Hidrometalúrgicas de Cobre, Antofagasta, Chile, Oct. 4, 2001.

\* cited by examiner

RECOVERY OF RESIDUAL COPPER FROM HEAP LEACH RESIDUES

CROSS-REFERENCE TO RELATED APPLICATIONS

This application claims the benefit under 35 U.S.C. §119 (e) of U.S. Provisional Patent Application No. 61/355,085 filed Jun. 15, 2010; and U.S. Provisional Application No. 61/473,408 filed Apr. 8, 2011, where these two provisional applications are incorporated herein by reference in their entireties.

BACKGROUND

Technical Field

The present application relates to recovery of copper from heap leach residues.

Description of the Related Art

Copper sulphide deposits near the surface of the earth react with percolating groundwater. The chemical reactions result in oxidation of the primary copper sulphide minerals, forming a region of secondary copper sulphide minerals, or even a region of copper oxide minerals. These two regions of mineral alteration are known as the "oxide cap" and the "supergene", both of which sit above the underlying unaltered "hypogene". The oxide cap is the topmost layer, composed predominantly of copper oxide and copper sulphate minerals. Below the oxide cap is the supergene zone, composed predominantly of secondary copper sulphide minerals, such as chalcocite ($Cu_2S$) and covellite (CuS). The hypogene zone is the bottommost layer, composed predominantly of primary copper sulphide minerals, such as chalcopyrite ($CuFeS_2$) and bornite ($Cu_5FeS_4$).

Heap leaching can be used to extract copper from primary and secondary copper sulphide minerals. In heap leaching, ore is stacked in leach pads to a specified height. These ore piles, also known as "heaps", are irrigated with a solution rich in acid and poor in dissolved copper ions. Chemical reactions within the heap consume acid and release copper ions from the ore, resulting in a solution exiting from the bottom of the heap that is poor in acid and rich in dissolved copper ions. Typically, the acid used is sulphuric acid.

The irrigating solution, which is rich in acid, is typically a raffinate solution from a solvent extraction plant. The solution exiting the bottom of the heap, which is rich in copper ions, is termed pregnant leach solution (PLS). In situations where the ore contains chalcocite ($Cu_2S$) and covellite (CuS), otherwise known as secondary sulphides of copper, the heaped ore is typically aerated from the bottom, as well as irrigated from the top.

While a heap is leached, the ore particles within the heap can break into smaller particles, creating "fines". Over time, this production of fines results in leached heaps losing their permeability. By the end of a leach cycle, the heap leach residues typically have a particle size distribution which is much smaller than the particle size distribution of the original ore. "Fine particles", or "fines", are particles that measure 150 μm or less in diameter, as measured using a wet screen method.

Examination of conventional heap leach data has shown significant size reduction of ore particles as the heap is leached. An example of this is shown in FIG. 1, which shows the particle size distributions of the starting ore and the heap leach residues after 424 days of heap leaching in a heap of 506,000 metric tons. By the end of the heap leach cycle, there were almost twice as much fines in the heap leach residue as in the original ore: 21 weight % vs. 12 weight %.

Bio-oxidative reactions convert the copper in the copper sulphide minerals into extractable copper. The bio-oxidative reactions are performed by bioleaching bacteria. The bioleaching bacteria can modify their environment and establish self-sustaining colonies that maintain the conditions for copper leaching. The bio-oxidative reactions require adequate supplies of oxygen and acid. In order to supply oxygen to the bacteria, it is desirable for the heaps to have free passage of air and percolating leach solution, even though the heaps may be piled several meters high. Segregation and accumulation of the fine particles can reduce free passage of air and percolation of leach solution, thereby reducing the amount of copper leached from the heap.

As with any commercial venture, heap leach operations maximize economic returns by processing highly profitable ores first, and by deferring processing of less valuable portions of the ore body until later. This results in ores with the highest copper grades being mined first, so that the copper grade decreases with time. Regardless of the copper grade, in a typical leaching cycle most of the copper is recovered from the heap at the beginning of the leaching cycle, with less and less copper being extracted towards the end of the leaching cycle. In order to maximize the economic return of the heap, the diminishing returns typically compel the operation to terminate the leaching cycle before all of the available copper is recovered. All of these factors combine to create a situation where the ore being processed at the end of mine life is close in value to the heap leach residues discarded earlier in the life of the mine.

Leaching copper sulphide ore in heaps typically takes several months, with diminishing amounts of copper being extracted as time progresses. On reaching a target extraction value, a heap is taken off-line and allowed to drain down. The resulting heap leach residues are then decommissioned since it is not financially worthwhile to continue to extract the smaller amount of copper still present in the heap leach residues.

Decommissioning heap leach residues can be performed by moving the residues from the pad to a waste dump, or capping the heap leach residues with an impermeable layer. In either case, the heap leach residues, with the remaining copper value, are typically abandoned even if not totally exhausted as a source of copper.

It is possible to reprocess heap leach residues in order to further extract copper.

Chilean Patent No. 1069-02 to Astudillo, M. S. describes a method for turning over part or all of the ore stacked in a heap, at any time during the leach cycle. The action of turning over the ore in a heap restores permeability to air and leach solution, thus improving copper recovery. The method described by Astudillo is essentially an intermission to the primary leach cycle, including an add-on to the end of the cycle, in which the fresh leach residues in the heap are restacked by digging and turning over essentially top to bottom in scoops.

Canadian Patent No. 2,391,091 to Hunter, C. J. describes a method for bacterially assisted heap leaching through the use of a second heap that serves as a bioreactor. This second heap acts to generate bacteria and ferric ion for use in the first heap stacked with ore.

A May 15, 2008 presentation by Garcia, C., Politis, M. and Argandoña, M. in Santiago, Chile at Hydroprocess 2008, International Workshop on Process Hydrometallurgy, entitled "Secondary leaching in Anglo American Chile—Mantos Blancos Division", describes stacking leached residues from vat leaching in heaps and leaching with sulphuric acid. This allows overall recovery from the original copper oxide ore to increase to 90%, from the initial 78%.

An Oct. 4, 2001 presentation by Yañez, H. in Antofagasta, Chile at I Coloquio de Operadores de Plantas Hidrometalúrgicas de Cobre, entitled "Lixiviación en División Radomiro Tomic", describes stacking leached residues from heap leaching in dumps and leaching with sulphuric acid. This allows overall recovery from the original copper oxide ore to increase to >80%, from the initial 70%. Oxide ore heap leaching is undertaken without aeration.

It is desirable to provide a method for recovering copper from heap leach residues.

BRIEF SUMMARY

According to a first aspect, a process for recovering copper from heap leach residues is provided. The process includes treating the heap leach residues to provide treated heap leach residues, the treated heap leach residues providing improved permeability of a heap of the treated heap leach residues; and leaching the heap of the treated heap leach residues with a leaching solution. Treating the heap leach residues includes: a) blending the heap leach residues with additional material to provide a blend; or b) agglomerating the heap leach residues; or c) both blending the heap leach residues with additional material and agglomerating.

The process may increase the permeability of the heap of the treated heap leach residue to air by at least an order of magnitude in comparison to the permeability of a heap of untreated heap leach residue to air, when the permeability is measured in Darcy units.

Treating the heap leach residues may include blending the heap leach residues with additional material to provide a blend such that the blend has a fines content of less than 32 weight %.

According to another aspect, a process for recovering copper from heap leach residues is provided. The process includes treating heap leach residues to provide treated heap leach residues having a fines content that is equal to or less than a predetermined value, and leaching the treated heap leach residues with a leaching solution. Treating the heap leach residues includes blending the heap leach residues with additional material to provide a blend.

According to another aspect, a process for extracting a metal from heap leach residues is provided. The process includes treating heap leach residues to provide treated heap leach residues, and leaching the heap of the treated heap leach residues with a leaching solution. The heap leach residues are treated by: blending the heap leach residues with additional material to provide a blend; or agglomerating the heap leach residues; or both blending the heap leach residues with additional material and agglomerating.

Treating the heap leach residues by both blending the heap leach residues with additional material and agglomerating the heap leach residues may include: blending the heap leach residues with the additional material to provide a blend; and agglomerating the blended heap leach residues and additional material.

Treating the heap leach residues by both blending the heap leach residues with additional material and agglomerating the heap leach residues may include: agglomerating the blended heap leach residues; and blending the agglomerated heap leach residues with the additional material.

Other aspects and features of the present application will become apparent to those ordinarily skilled in the art upon review of the following description of specific embodiments of the application in conjunction with the accompanying figures.

BRIEF DESCRIPTION OF THE SEVERAL VIEWS OF THE DRAWINGS

Embodiments of the present application will now be described, by way of example only, with reference to the attached figures, wherein.

DETAILED DESCRIPTION

Generally, the present application provides a process for recovering copper from heap leach residues, the heap leach residues including primary, secondary, or mixtures of primary and secondary sulphides of copper. Heap leach residues used in the method can be obtained from leaching secondary sulphides of copper, such as chalcocite ($Cu_2S$) and covellite (CuS), from a supergene ore body, and/or from leaching primary sulphides of copper, such as chalcopyrite ($CuFeS_2$) and bornite ($Cu_5FeS_4$), mined from a hypogene ore body.

In the process of the present application, heap leach residues are treated so as to produce treated heap leach residues, where the treated heap leach residues provide improved permeability of a heap of those treated heap leach residues. The heap of the treated heap leach residues is leached with a leaching solution, as illustrated in FIG. 2 and discussed below.

Figure 1:
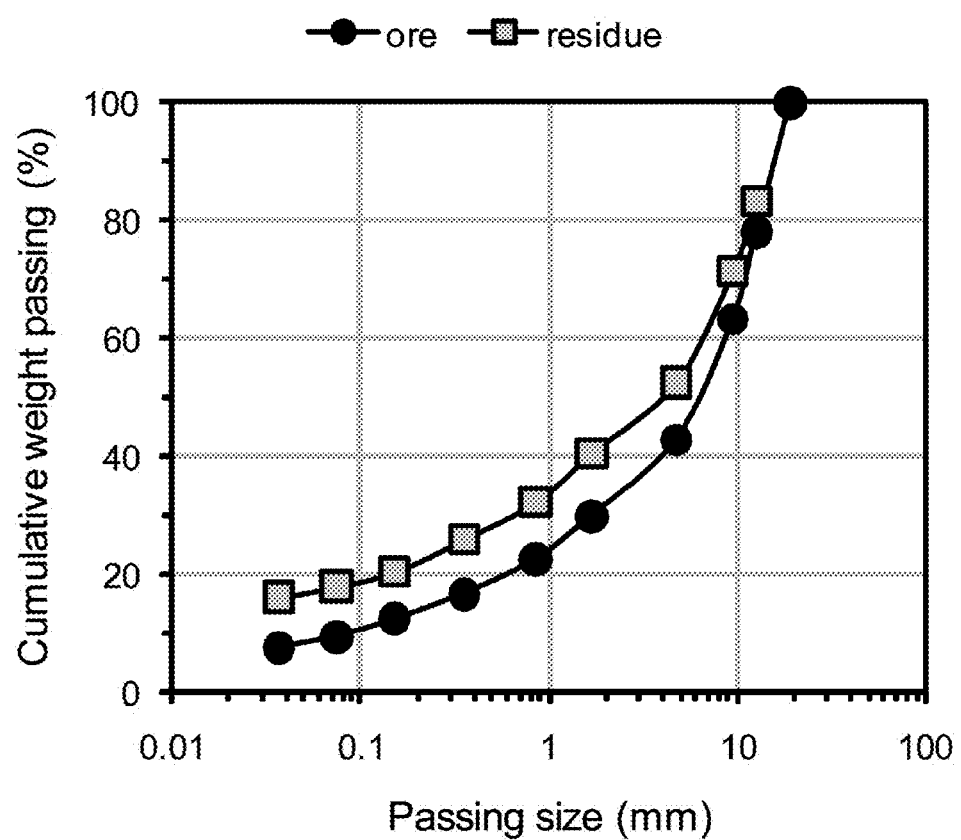
FIG. 1 is a graph showing the particle size distribution of the starting ore and the heap leach residues after 424 days of heap leaching.
Figure 2:
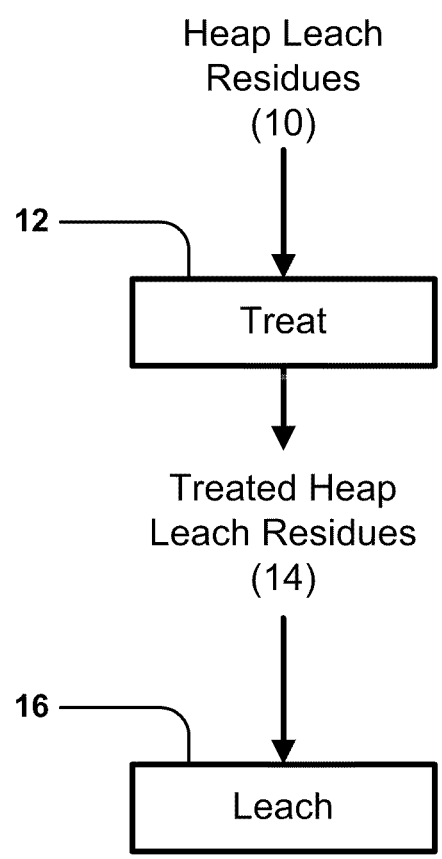
FIG. 2 is a simplified flow diagram illustrating a method for leaching copper from heap leach residues.

As illustrated in FIG. 2, the process can be utilized for leaching heap leach residues 10. The heap leach residues 10 are treated at 12 to produce treated heap leach residues 14 where a heap of the treated heap leach residues has improved permeability in comparison to a heap of untreated heap leach residues.

The treating steps and parameters are adjusted to control the permeability of a heap of treated heap leach residues to air and leaching solution. Treating the heap leach residues 10 may include introducing acid and moisture to commence leaching reactions. The permeability of the treated heap leach residues 14 may be adjusted during the treating step 12 by adding additional materials, agglomerating the heap leach residues, or both adding additional materials and agglomerating. The heap of treated heap leach residues 14 is leached at 16.

Figure 3:
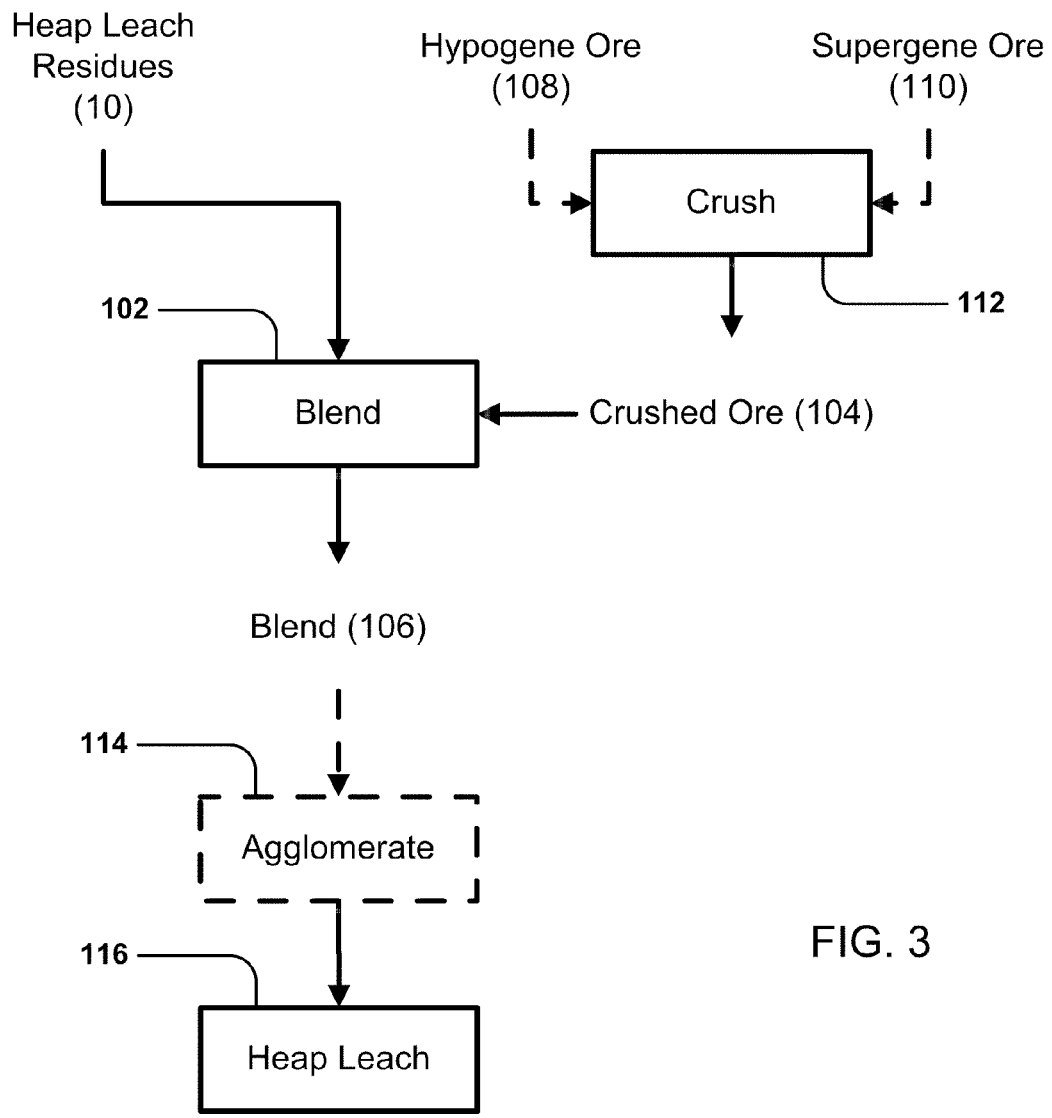
FIG. 3 is a simplified flow diagram illustrating an embodiment of the method where the heap leach resides are blended with additional materials.
Figure 4:
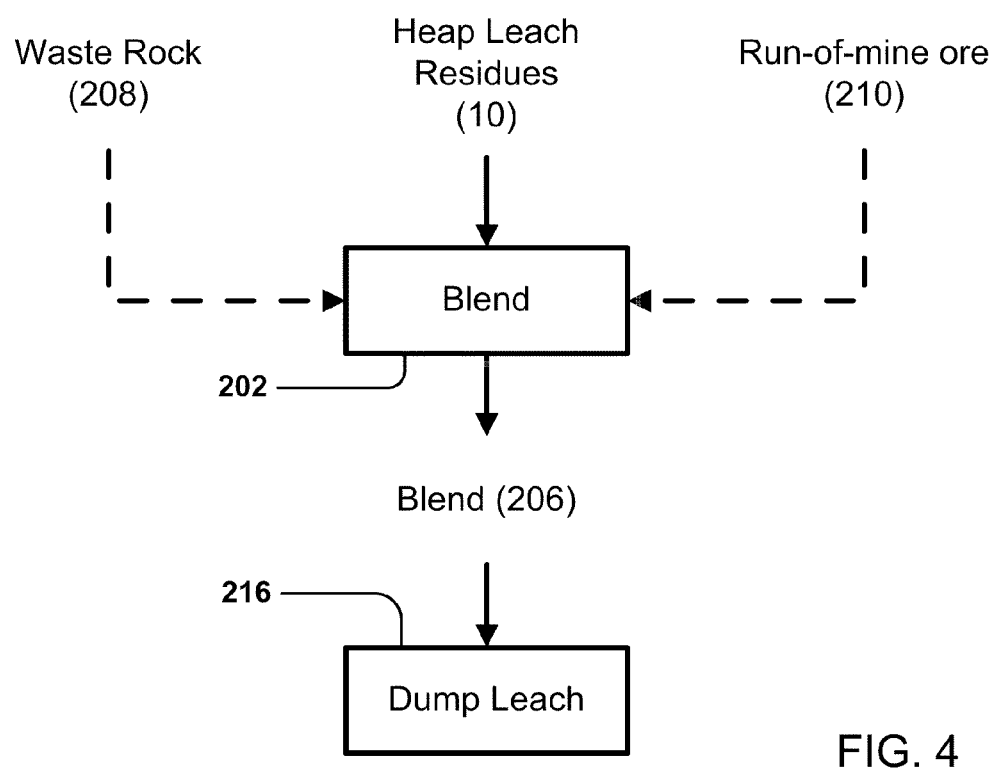
FIG. 4 is a simplified flow diagram illustrating another embodiment of the method where the heap leach resides are blended with additional materials.

According to one embodiment of the process, illustrated in FIGS. 3 and 4, heap leach residues are treated by blending the heap leach residues with additional material in order to produce a blend of predefined fines content, and leached using a heap or dump leach process. The additional material can include crushed ore, run-of-mine ore, low grade ore, marginal ore, and/or waste rock. Various alternatives for treating heap leach residues by blending are discussed below.

The heap leach residues are blended with additional material such that the fines content of the resulting blend does not exceed a predefined value. The fines content of the blend is less than or equal to 32 weight %. In some embodiments, the fines content of the blend is less than 25 weight %. In other embodiments, the fines content of the blend is less than 15 weight %.

To achieve the above fines content of the blend, the crush size of the additional material is adjusted, or the proportion of additional material is adjusted, or both the crush size and the proportion of additional material are adjusted. The amount of additional material added to the blend can range from 0% to 75%, by weight, of the blend.

The additional material added to the heap leach residues can be crushed ore, as illustrated in FIG. 3. The additional material added to the heap leach residues to generate the blend can be run-of-mine ore, low grade ore, marginal ore, and/or waste rock, as illustrated in FIG. 4.

As illustrated in FIG. 3, the method can be utilized for leaching heap leach residues 10. The heap leach residues 10 are blended at 102 with crushed ore 104 to produce heap blend 106. The crushed ore is an unleached copper sulphide bearing material 104 and contains sulphides of copper mined (a) from hypogene ore 108 having predominantly primary sulphides and/or (b) from supergene ore 110 having predominantly secondary sulphides.

The particle size of the crushed ore 104 can be achieved as described above, where the crushing step, which may include screening, is shown at 112. The crush parameters are adjusted to control particle size distribution. The heap leach residues 10 and the crushed ore 104 are further mixed and are optionally agglomerated at 114. When additional material is added to the heap leach residues 10, agglomeration (a) further blends the heap leach residues 10 with the crushed hypogene ore 108 and/or crushed supergene ore 110, (b) aggregates fine particles into larger stable particles, and (c) introduces acid and moisture to commence leaching reactions. Blending heap leach residue 10 with crushed ore 104, and optionally agglomerating the blend, increases permeability of the blend 106 to air and leaching solution once the blend is placed on the leach pad. The permeability of the heap 106 can be adjusted by manipulating the moisture content and amount of acid added to the heap blend in the agglomeration step. The blend 106 is heap leached at 116.

As illustrated in FIG. 4, the method can be utilized for leaching heap leach residues 10, where the heap leach residues 10 are blended at 202, thereby providing blend 206, with waste rock 214, and/or marginal ore 212, and/or low-grade ore 210), and/or run-of-mine ore 208 obtained from supergene ore body and/or hypogene ore body, as illustrated by the dashed lines leading from waste rock 214, marginal ore 212, low-grade ore 210, and run-of-mine ore 208. The waste rock 214 or marginal ore have a copper content below the mine's cutoff grade. The blend 206 is dump leached at 216.

In the methods illustrated in FIG. 3 and FIG. 4, the heap leach residues 10 can be removed from the existing pad before being blended at 102 or 202. Alternatively, the heap leach residues can be reclaimed from a dump. According to the method of FIG. 3, before the blend 106 is leached, the blend 106 is deposited and stacked in a heap. Such heaps can be between 6 and 10 m in height. According to the method of FIG. 4, the heap blend 206 can be deposited in dumps and dump leached at 216 in place. Such dumps can be between 10 and 60 m in height. As indicated above, heap leach residues may be reclaimed from a dump. Such reclaimed heap leach residues are described as "aged", in contrast to the "fresh" residues initially deposited in the dumps.

The blend 106 or 206 can be irrigated with a leaching solution at a rate of between 0.1 and 5.0 $L/m^3 \cdot h$. From a practical perspective, higher rates would result in flooding of the heap. In particular embodiments of the heap leach process 116, the irrigation rate is between 0.5 and 5 $L/m^3 \cdot h$, and in some embodiments is between 1.0 and 5.0 $L/m^3 \cdot h$. In particular embodiments of the dump leach process 216, the irrigation rate is between 0.1 and 3.0 $L/m^3 \cdot h$, and in some embodiments is between 0.1 and 0.5 $L/m^3 \cdot h$. The leaching solution can have a sulphuric acid concentration of between 3.0 and 10.0 g/L.

When stacked in heaps for heap leaching at 116, the heap blend 106 can be aerated from the bottom by means of an air blower and a grid of perforated pipes or lines. The aeration rate can be between 0.2 and 3.0 $m^3/m^2 \cdot hour$.

Bacterial colonies that are already established in the heap leach residues 10 can serve as inoculants for the crushed ore 104. Copper recovery from the crushed ore 104 can start faster in the blend 106 than in a heap without bacterial colonies (e.g., in heap used in normal heap leaching) because the initial bacterial colonization step, which is typically required in normal heap leaching, is not necessary. The heap leach residues 10 can thereby accelerate copper leaching in the blend 106.

Figure 5:
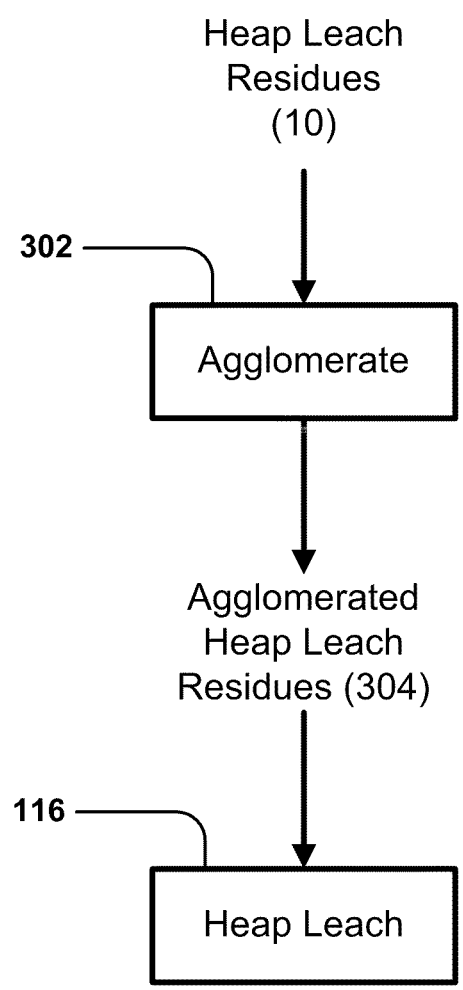
FIG. 5 is a simplified flow diagram illustrating an embodiment of the method where the fines in the heap leach residues are agglomerated to form larger stable particles.

According to another embodiment of the method, illustrated in FIG. 5, heap leach residues 10 are treated to produce a treated heap leach residue with greater permeability by agglomerating fine particles at 302 in the heap leach residues into larger stable particles, producing agglomerated heap leach residues 304 with an apparent lower fines content.

When no additional material is added to the heap leach residues, agglomeration involves clumping fine particles together and clumping fine particles with coarser particles which are already present in the heap leach residues. The resulting agglomerated particles tend to behave as ore with a coarser particle size and result in a heap with increased permeability to air and leaching solution when the agglomerated heap leach resides are placed on the leach pad. Agglomeration may be accomplished by, for example, passing the heap leach residues through a rotating drum with internal lifters and adding acid and water or raffinate solution by spraying. The tumbling motion inside the rotating drum aids the moistened heap leach residues to clump together or aggregate. This results in the fine particles sticking to each other and to the coarser particles already present in the heap leach residues.

The agglomeration parameters are adjusted to control particle size distribution. Agglomerating the heap leach residues 10 may include introducing acid and moisture to commence leaching reactions. The permeability of the agglomerated heap leach residues 304 may be adjusted by manipulating the moisture content and amount of acid during the agglomeration step 302. The agglomerated heap leach residues 304 are heap leached at 116.

Heap leach residues 10 may be treated using a combination of different treating methods, for example by agglomerating fine particles in the heap leach residue into larger stable particles (as illustrated in FIG. 5) or by blending the heap leach residues with additional material (as illustrated in FIGS. 3 and 4). A process that includes a combination of different treating methods is illustrated in FIG. 3 where the blended material is optionally agglomerated at 114.

Figure 6:
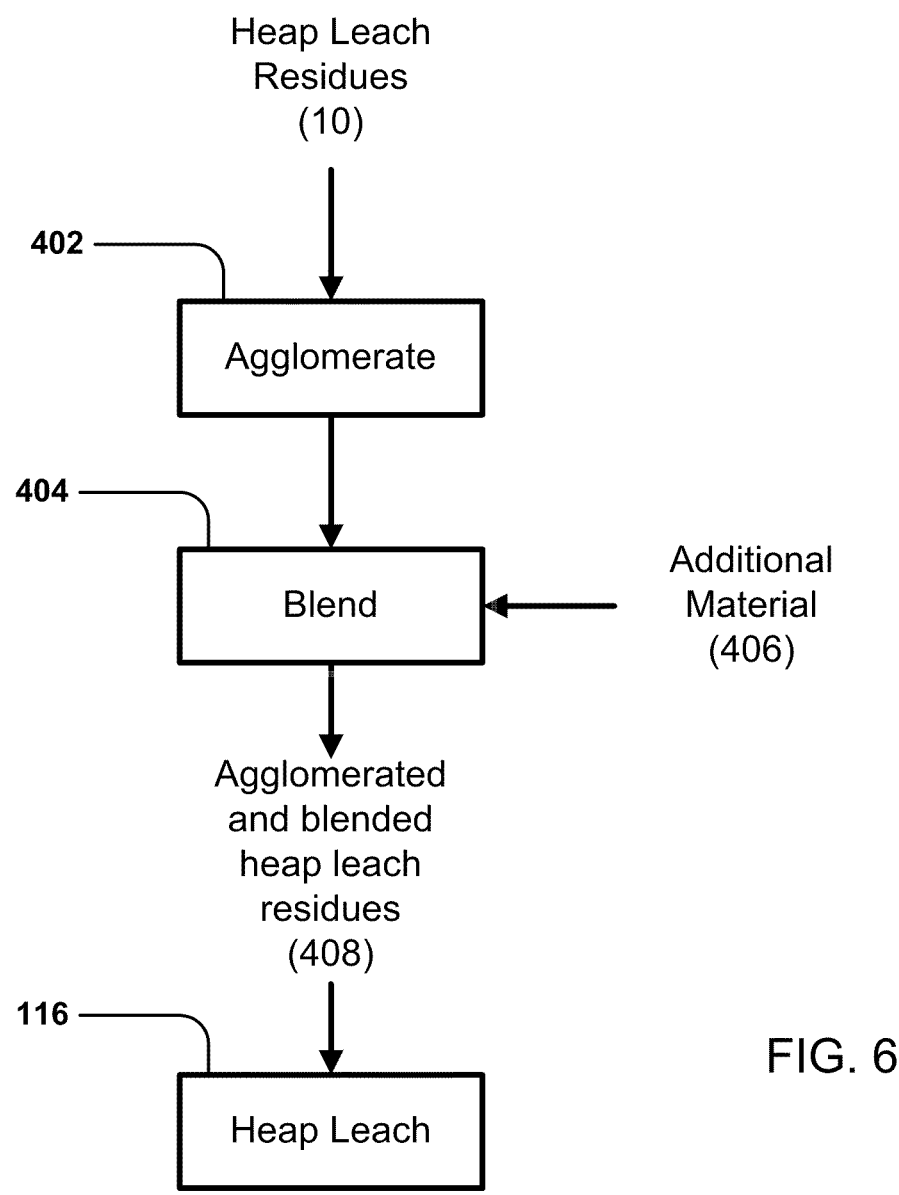
FIG. 6 is a simplified flow diagram illustrating an embodiment of the method where the fines in the heap leach residues are both agglomerated to form larger stable particles and blended with additional materials.

Another process that includes a combination of different methods is illustrated in FIG. 6 where the fine particles are agglomerated at 402 and the agglomerated heap leach residues are blended at 404 with additional materials 406, producing agglomerated and blended heap leach residues 408, which are then heap leached at 116. As discussed above, the amount of additional material added to the blend can range from 0% to 75%, by weight, of the blend, where adding 0% of additional material corresponds to treating the heap leach residue in an alternative manner, for example by agglomerating the heap leach residues.

Example 1

Figure 7:
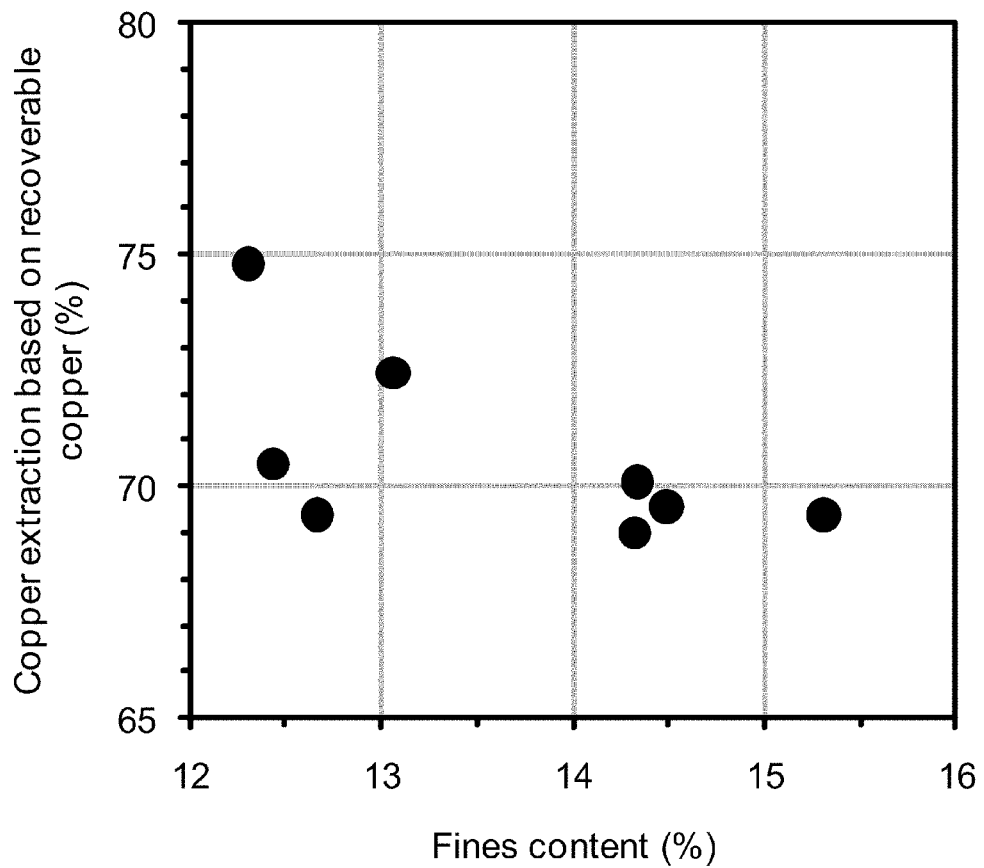
FIG. 7 is a graph showing the effect of fines content on the copper extraction.

Particle size distribution has been shown to effect the degree of copper recovery from secondary sulphide ore. An example of this is illustrated in FIG. 7, which shows copper recovery from a conventional heap leach, based on recoverable copper, as a function of the original fines content in the stacked ore. Higher content of fines can be seen to be associated with lower copper recovery. Each point in FIG. 7 corresponds to a heap having between 400,000 and 800,000 metric tons of stacked ore. These heaps were operated in a similar manner and were stacked with copper sulphide ore of similar grade, mineralogy, and rock characteristics. The copper recovery values correspond to values obtained after 300 days of leaching and after having been exposed to 3.8±0.1 $m^3$ of irrigating solution per metric ton of stacked ore.

Example 2

Lab scale leaching results for various blends of heap leach residues and crushed ore are shown in Table 1. The tests consisted of leaching (a) heap leach residues, (b) crushed ore, and (c) different mixtures of heap leach residues and crushed ore, in columns measuring 15 cm in diameter×1.5 m in height. Raffinate solution from a solvent extraction plant was used to irrigate the columns for 67 days. Copper leaching was monitored continuously through analyses of feed and effluent solutions. At the end of the leaching cycle, the residual column material was analyzed for copper recovery.

TABLE 1

Recovery of copper from various blends of heap leach residues and crushed ore

| | | | | | |
|---|---|---|---|---|---|
| Heap Leach Residues | 100% | 70% | 60% | 50% | — |
| Crushed Ore | — | 30% | 40% | 50% | 100% |
| Recoverable copper content | 0.16% | 0.33% | 0.39% | 0.45% | 0.75% |
| Number of replicates | 6 | 5 | 6 | 6 | 5 |
| Leach time | 67 days | 67 days | 67 days | 67 days | 67 days |
| Maximum recovery | 28.9% | 63.7% | 67.5% | 70.4% | 71.7% |
| Minimum recovery | 18.5% | 57.6% | 60.5% | 59.4% | 66.8% |
| Mean recovery | 22.4% | 60.5% | 63.9% | 63.8% | 69.8% |
| Predicted Recovery | 22.4% | 54.2% | 58.4% | 61.6% | 69.8% |
| Difference in recovery | — | +6.3 | +5.5 | +2.2 | — |

As shown in Table 1, the average copper recoveries of heap leach residues and crushed ore blends were higher than the recoveries predicted from their individual components. The predicted recovery is determined from the typical recovery for the copper content of the residue component and the typical recovery for the copper content of the crushed ore component. The higher copper recovery than the predicted recovery is explained by the dilution of the fines in the residue component. As shown in the "Difference in recovery" line in Table 1, the dilution effect is immediately apparent at lower levels of the crushed ore addition.

Figure 8:
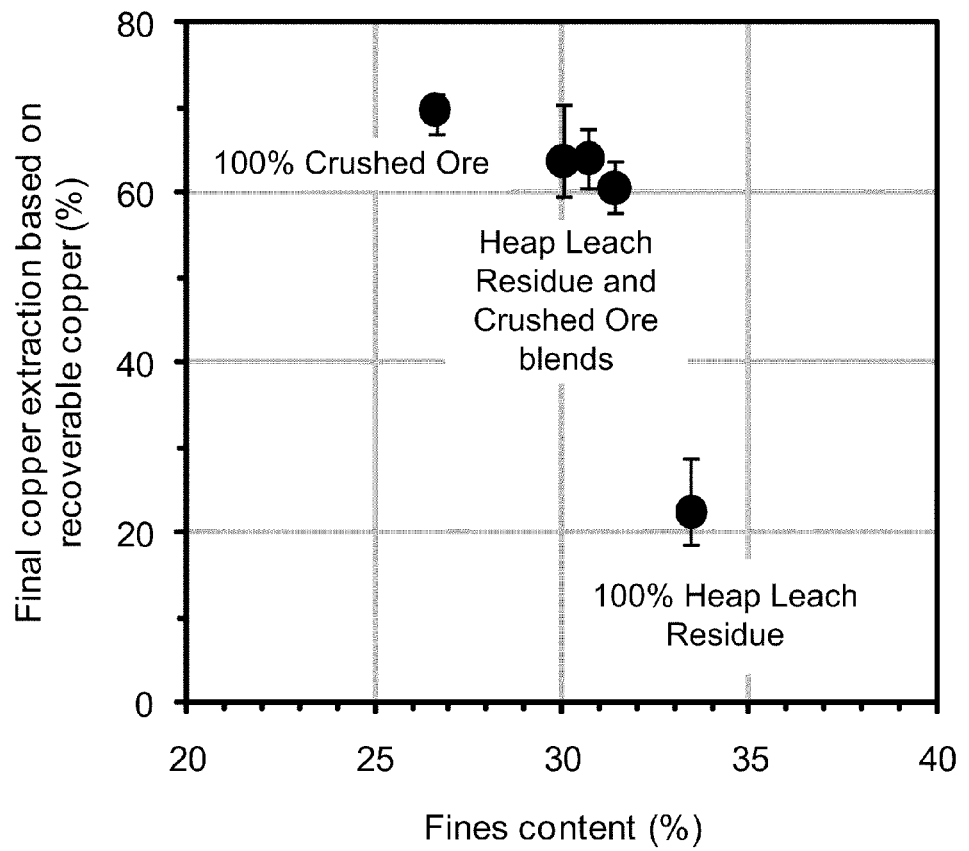
FIG. 8 is a graph showing the effect of fines content on the final copper extraction.

FIG. 8 shows a plot of the mean copper recoveries versus the fines content of each of the heap leach residues and crushed ore blends. The error bars correspond to the maximum and minimum copper recovery for that blend. As shown in FIG. 8, copper recovery decreases with increasing fines content in the material being leached. Copper leaching from heap leach residues is hindered by increased fines content and this hindrance was overcome in a progressive manner as ore was added in increasing proportions.

Example 3

Figure 9:
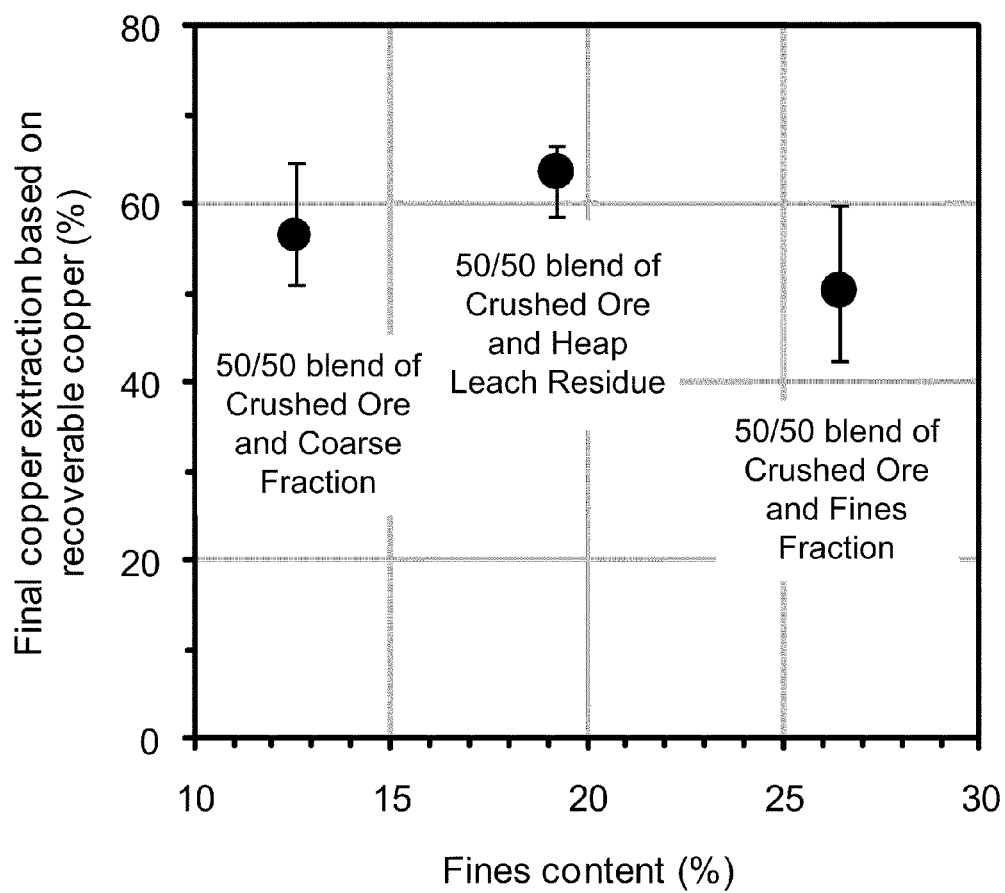
FIG. 9 is another graph showing the effect of fines content on the final copper extraction.

In other lab scale leaching tests, dry heap leach residues were passed through a 13 mm screen, generating a "fines fraction" rich in fines, and a "coarse fraction" poor in fines. Newly crushed ore was then mixed with (a) unscreened residues, (b) the fines fraction, or (c) the coarse fraction, in 50/50 blends by weight. The resulting blends were leached in columns measuring 15 cm in diameter by 1.5 m in height. Raffinate solution from a solvent extraction plant was used to irrigate the columns. Each test was carried out in triplicate. Copper leaching was monitored continuously through analyses of feed and effluent solutions. FIG. 9 shows the copper recovery values after 83 days of leaching. The error bars correspond to maximum and minimum copper recoveries for a particular blend.

As shown in FIG. 9, newly crushed ore blended with the fines fraction resulted in a blend having a fines content that was almost 40% higher than the fines content of the blend with unscreened material. Conversely, blending newly crushed ore with the coarse fraction resulted in a blend having a fines content that was more than 30% lower than the fines content of the blend with unscreened material. While it is generally understood that higher recoveries are achieved with finer material since finer materials provide more surface area from which a compound can be extracted, other leach-limiting issues develop when the fines content becomes too high. As shown in FIG. 9, copper recovery increased with fines content up to about 19 weight % of fines, but then diminished as the amount of fines increased.

Example 4

Figure 10:
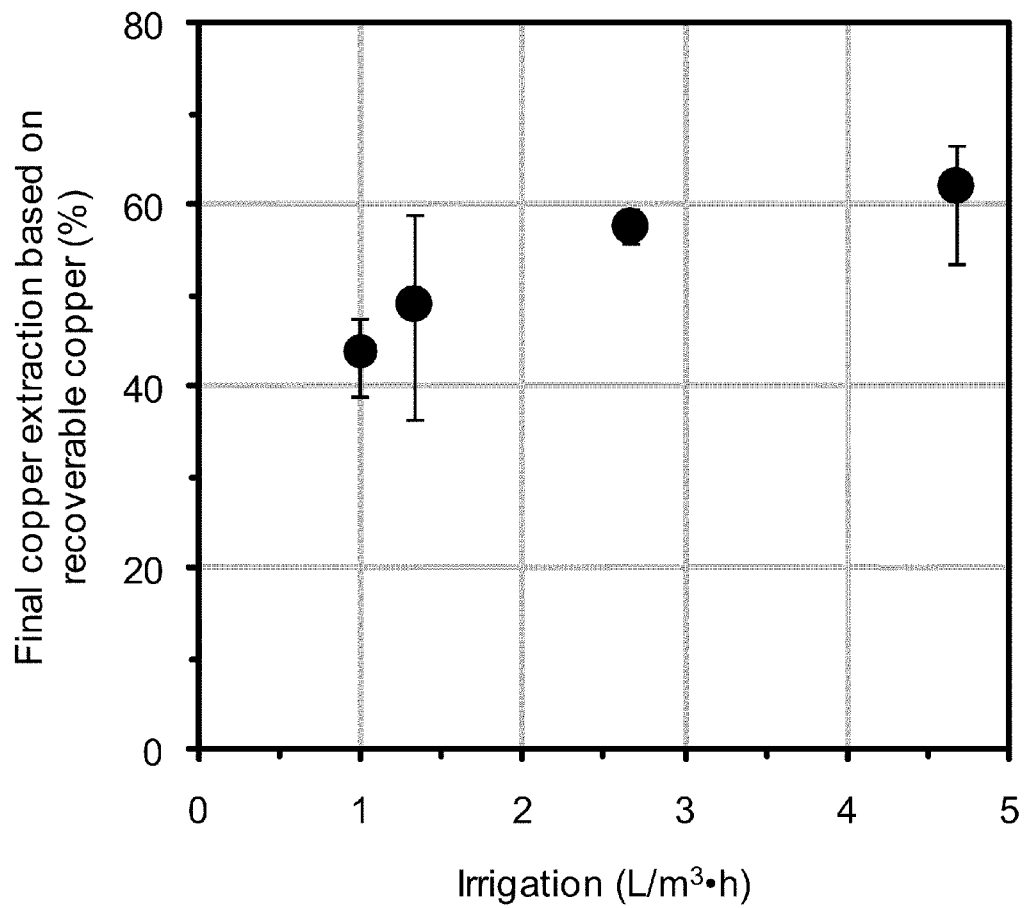
FIG. 10 is a graph showing the effect of irrigation rate on the final copper extraction.

In further lab scale leaching tests, newly crushed ore was blended with unscreened heap leach residues in a 50/50 blend. The blends, having similar fines content, were leached at different rates of irrigation in columns either measuring 15 cm in diameter by 1.5 m in height, or in columns measuring 15 cm in diameter by 7 m in height. Raffinate solution from a solvent extraction plant was used to irrigate the columns. Each test was carried out in triplicate. Copper leaching was monitored continuously through analyses of feed and effluent solutions. FIG. 10 shows the copper recovery values after 83 days of leaching at different irrigation rates. The error bars illustrated correspond to the maximum and minimum copper recoveries for that given irrigation rate.

The irrigation rates plotted in FIG. 10 are expressed as hourly volume of solution applied per cubic meter of material being leached. This allows for normalization with regard to column height, or heap height. As shown in FIG. 10, copper recovery increases with increasing irrigation rate. Attempting to compensate for poor permeability by reducing the irrigation rate compromises copper extraction and the general economics of the copper leaching operation. Controlling the fines content is much more advantageous.

Example 5

Figure 11:
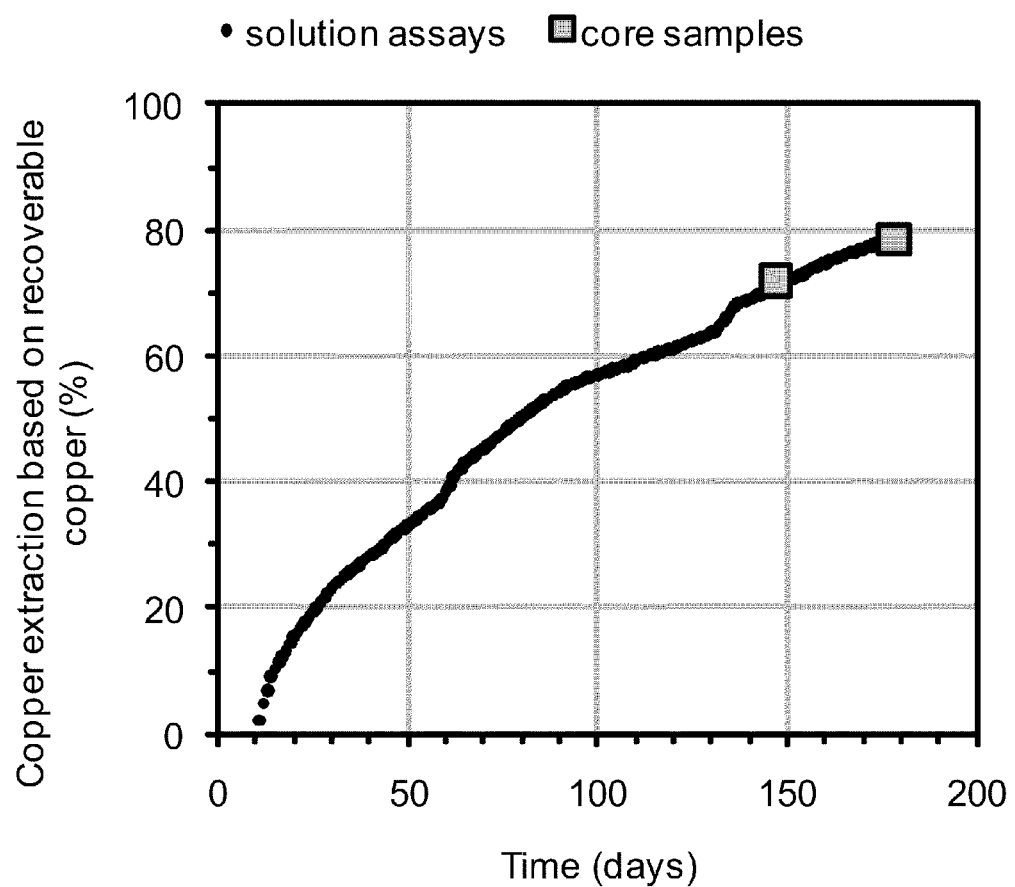
FIG. 11 is a graph showing a copper recovery curve of a heap blend being leached, the heap blend including heap leach residues and crushed ore.

In a pilot scale leaching test, a pilot heap was stacked with a heap blend of heap leach residues and crushed ore, and leached for 178 days. This heap blend consisted of 25% crushed ore and 75% heap leach residues. The pilot heap had approximately 2,600 metric tonnes of material under irrigation, stacked to a height of approximately 6 m. A system consisting of a blower and buried air distribution lines, aerated the pilot heap. Raffinate solution from a solvent extraction plant was used to irrigate the pilot heap at a rate that averaged 1.9 L/m$^3$·h, but on occasion was as high as 2.8 L/m$^3$·h. The height-adjusted maximum irrigation rate was equivalent to a solution application of 17 L/m$^2$·h. The leaching curve of the pilot heap is shown in FIG. 11.

Within 180 days of leaching, a copper recovery of 79% was obtained, based on recoverable copper. This copper recovery was calculated based on solution assays and confirmed through analyses of core samples taken at the end of the leaching test.

Example 6

Heap leach residues were agglomerated by passing the heap leach residues through a rotating drum with internal lifters and spraying acid and/or water in varying amounts to generate agglomerated heap leach residues. Both agglomerated and non-agglomerated heap residues were tested for their permeability to air by packing a column with the material and forcing air through the packed column at various flow rates, measuring the pressure drop across the packed bed. A plot of the pressure differential as a function of air flow rate provides a measure of permeability according to the Darcy equation:

$$k_i = 1.013 \times 10^{12} \frac{G\ \mu_{air}\ h}{\Delta P}$$

where $k_i$ is the permeability in Darcy units, G is the forced aeration rate in m$^3$/m$^2$·s, h is the bed height, $\mu_{air}$ is the air viscosity in Pa·s, and $\Delta P$ is the pressure drop across the bed in Pa (pascals) [Bartlett, R. W., 1992, *Solution Mining: Leaching and Fluid Recovery of Materials* (2nd ed.), Gorden and Breach, Singapore, p. 248].

Figure 12:
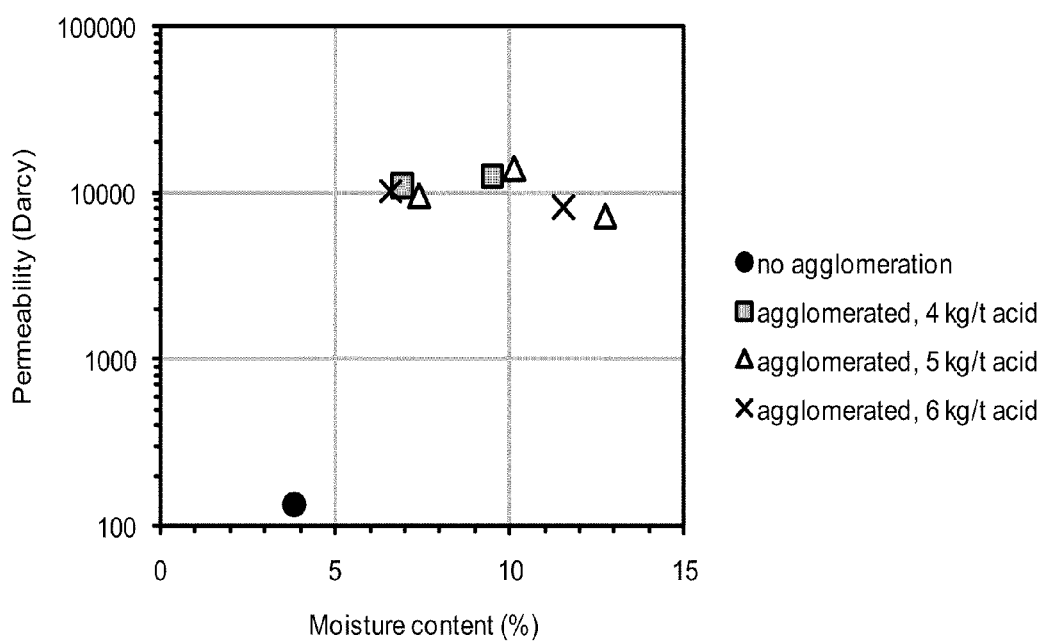
FIG. 12 is a graph showing the effect of agglomeration on the permeability of the agglomerated heap leach residues.

FIG. 12 depicts the effect of agglomeration on the permeability of agglomerated and non-agglomerated heap leach residues. As shown in FIG. 12, agglomeration increases permeability of the packed bed by almost two orders of magnitude and may be further increased by changing the moisture content and the acid dosage, for example based on the characteristics of the heap leach residues being aggregated. As shown in FIG. 12, moisture content has a greater effect on agglomeration than does acid dosage.

Example 7

Agglomerated and non-agglomerated heap residues, generated as discussed with respect to Example 6, were re-leached in triplicate columns for 60 days. When not agglomerated, the 100% residues had a reduced permeability to irrigating solution and reduced percolation of the irrigating solution through the bed. This resulted in an increased variability in copper recovery in comparison to the copper recovery of the beds of agglomerated heap leach residues.

Example 8

Approximately 2 tons of residues were obtained for an agglomeration test program from a selected site. It would be understood that the composition of heap residues can vary from site to site and that different results may be found for different heap residues. Several representative sub-samples, of approximately 20 kg each, were obtained using a cone and quartering method.

The residues had an average moisture content of 5.2±0.2%, within 95% confidence limits. The particle size distribution corresponded to a $P_{80}$ of 24.5 mm and fines content (100 Mesh) of 2%.

Agglomerate quality was evaluated based on its permeability to forced aeration. Heap residues were agglomerated with solvent extraction (SX) raffinate and concentrated sulphuric acid using a cement mixer. Each agglomerate product was used to charge a 1 m tall, 10 cm inside diameter column fitted with an air line, flow meter, and manometer. Air was forced upwards through the agglomerate bed at six different flow rates, measuring the pressure drop across the height of the bed. Pressure drop was plotted as a function of air flow rate according to Darcy's Law, as discussed above.

The permeabilities were measured simulating heaps up to 8 m in height. This was accomplished by placing lead weights on top of the agglomerate bed in the column, thus simulating compaction due to stacking. The degree of compaction was measured with successive addition of lead weights. A 1.5 t/m³ agglomerate bulk density was assumed.

Figure 13A:
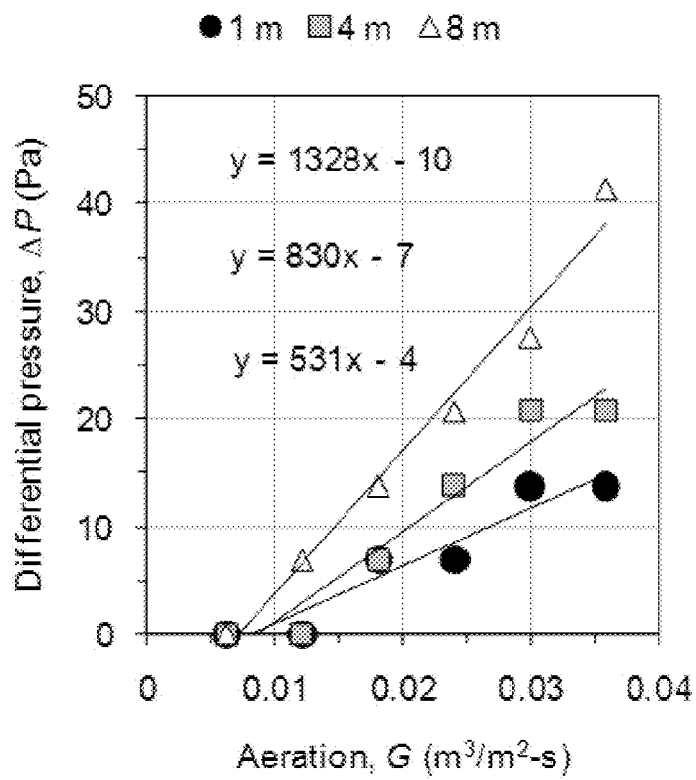
FIG. 13A is a graph showing the resistance to air flow, measured as pressure differential, as a function of air flow, for agglomerated heap residues at different simulated stacking heights.
Figure 13B:
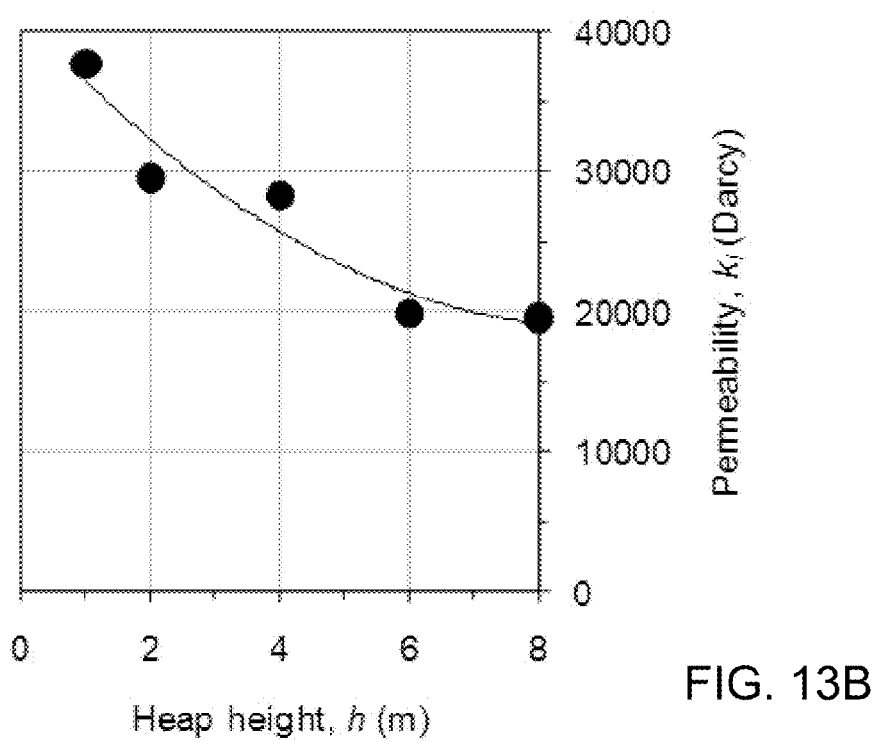
FIG. 13B is a graph showing the permeabilities of the agglomerated heap residues as a function of the simulated heap height.

Referring to FIG. 13A, the resistance to air flow, measured as a pressure differential, was plotted as a function of air flow for each simulated stacking height. The inverse of the slope (G/ΔP) was used in the Darcy's Law equation to calculate the permeability. Referring to FIG. 13B, the permeabilities were plotted as a function of the simulated heap height. The permeabilities correspond to the permeability experienced by the agglomerate at the very bottom of a heap.

Example 9

Heap residues, obtained as discussed in Example 8, were agglomerated with different dosages of raffinate and acid. Moisture contents were measured before and after agglomeration.

Figure 14:
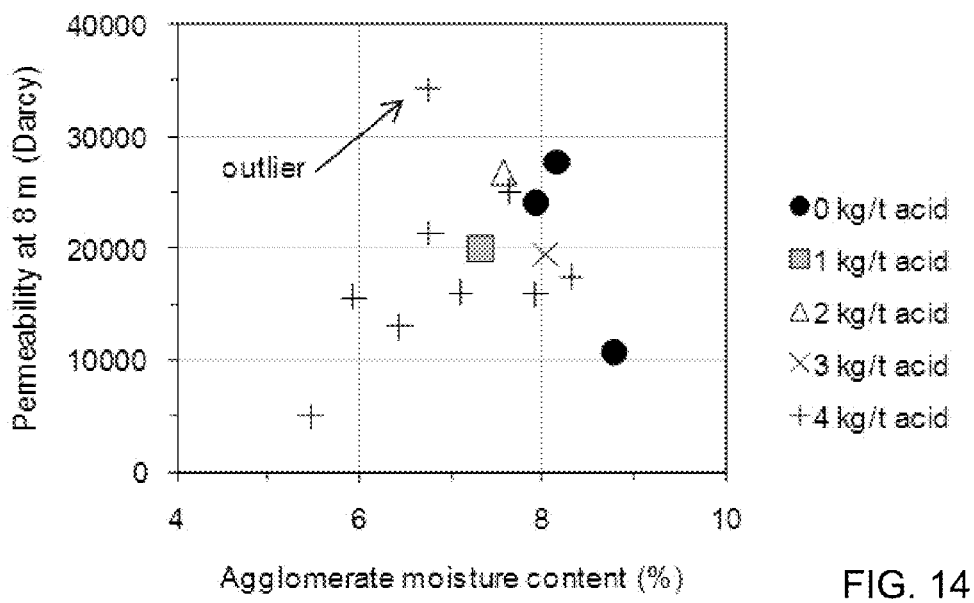
FIG. 14 is a graph showing the permeability results as a function of moisture content for the residues agglomerated using different dosages of acid.

FIG. 14 is a graph showing the permeability results obtained for the residues agglomerated using different dosages of acid. All of the permeability values correspond to simulated heap heights of 8 m. Moisture contents are indicated in wt. %. Acid addition did not appear to influence the permeability of the agglomerate. Final moisture content of 8% resulted in an agglomerate with improved permeability, while moisture content of less than 6.5% or higher than 8.5% resulted in an agglomerate with reduced permeability.

Figure 15:
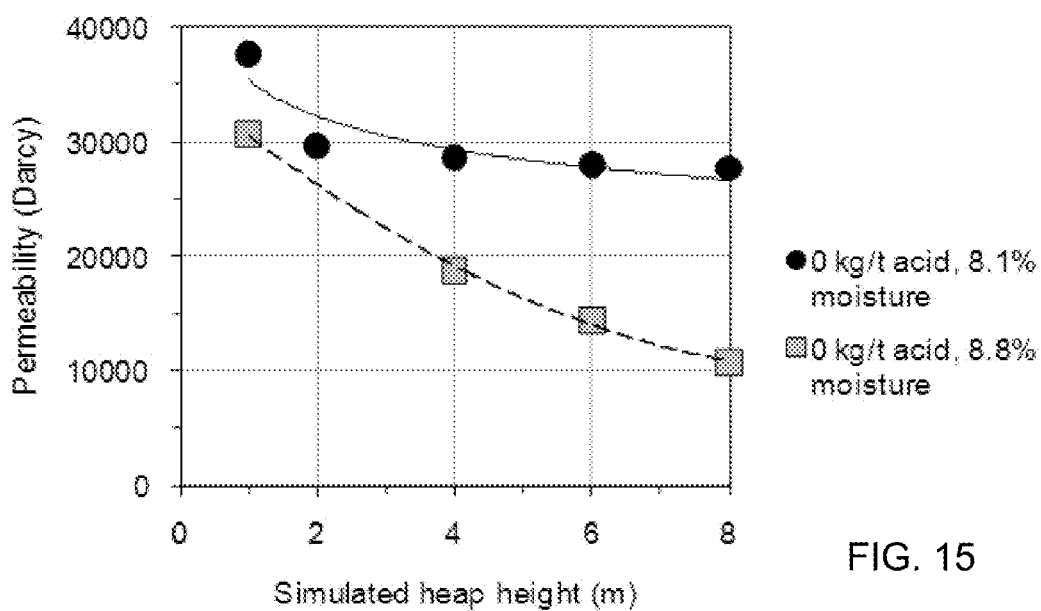
FIG. 15 is a graph showing the permeability of agglomerates at different heap heights for two different moisture contents.

FIG. 15 is a graph comparing the permeability of an agglomerate at 8.1% moisture with the permeability of an agglomerate at 8.8% moisture for different heap heights. As illustrated in FIG. 15, the agglomerate at 8.8% moisture showed reduced permeability and is more sensitive to stacking height.

Figure 16:
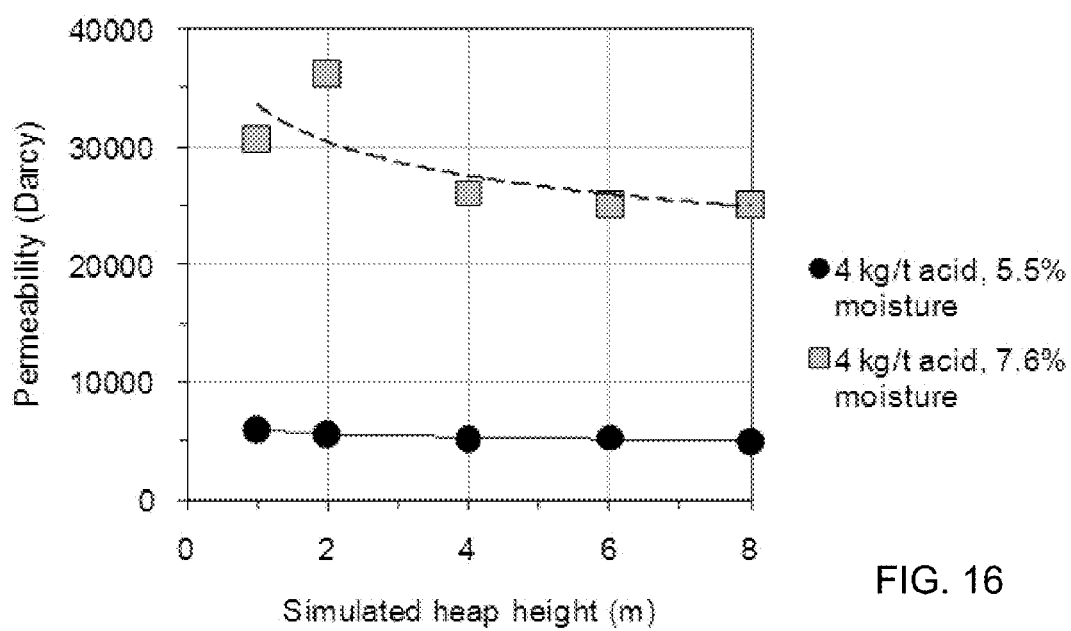
FIG. 16 is a graph showing the permeability of agglomerates as a function of heap height for two different moisture contents.

FIG. 16 is a graph comparing the permeability of an agglomerate at 7.6% moisture with the permeability of an agglomerate at 5.5% moisture. As illustrated in FIG. 16, the agglomerate at 5.5% moisture showed reduced permeability. At 5.5% moisture, it is believed that fines block the passage of air and result in decreased permeability.

Example 10

Irrigation tests were carried out with agglomerates, obtained as discussed in Example 8, to determine flow rates that could be tolerated. Water was used as the irrigating solution. The irrigation rates used ranged from 10 up to 76 L/m²·h. The procedure consisted of applying water to the top of the agglomerate bed in the column and allowing percolation until effluent came out the bottom of the column.

At solution breakthrough, the column with agglomerate was weighed to determine the bulk density and the solution holdup volume. Permeability of the agglomerate was then measured at a simulated stacking height of 8 m.

Figure 17A:
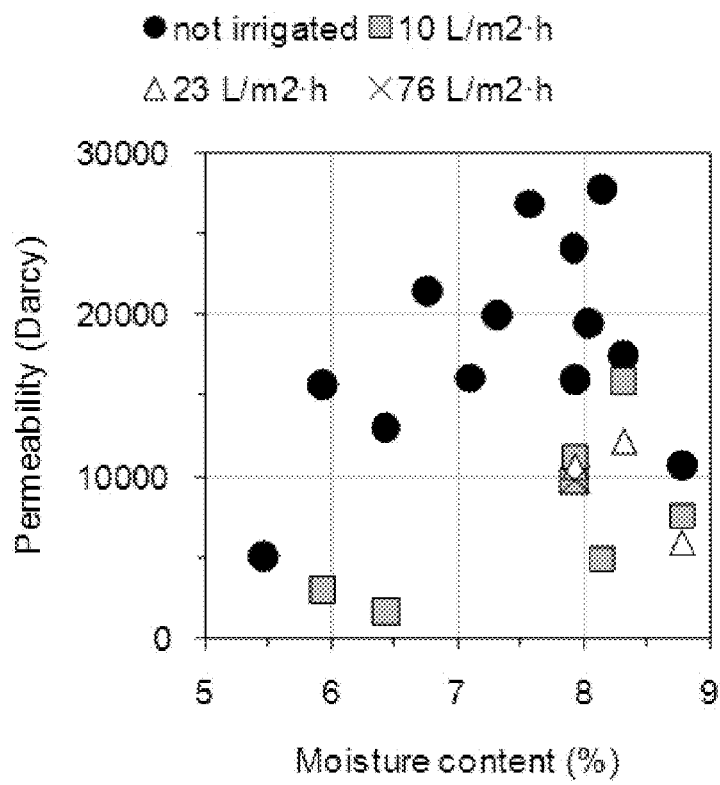
FIG. 17A is a graph showing the permeability of agglomerates as a function of moisture content for different irrigation rates.

FIG. 17A is a graph illustrating the effect of irrigation on the permeability of different agglomerates. Although irrigating the agglomerates decreases the agglomerates' permeability to air, the heap remains functional. On average, the permeability decreased by 54±29% and the bulk density increased by 9.2±8.5%.

Figure 17B:
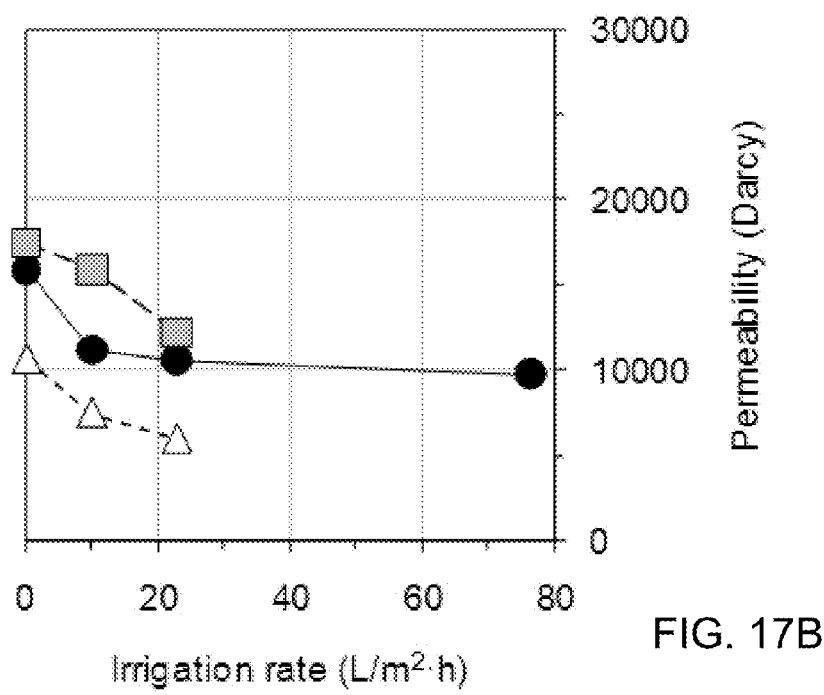
FIG. 17B is a graph showing the permeability of the agglomerates as a function of the irrigation rate for different moisture content.

As illustrated in FIG. 17B, the permeability of agglomerates which were formed at 7.9% or 8.3% moisture did not drop significantly below 10,000 Darcy at an irrigation rate of 76 L/m²·h. Even when irrigating excessively wet agglomerate, for example, at 8.8% moisture content, at 23 L/m²·h, the permeability did not drop below 5,000 Darcy. The highest irrigation rates failed to cause flooding of the agglomerates.

Tests suggest that it may be beneficial to begin irrigation of agglomerated residues at reduced rates (for example at irrigation rates equal to or less than 10 L/m²·h). These initial irrigation rates may be increased later during a leaching process, for example once solution breakthrough is observed.

With regard to the tests discussed in Examples 8 to 10, the agglomeration tests were completed with heap residues from one specific site. It should be noted that heap residues can vary in composition from site to site and that different results may be found for heap residues of different compositions. The tests discussed in Examples 8 to 10 illustrate that these particular heap leach residues agglomerated to a final moisture content between 7.5 and 8.5% were more permeable than residues agglomerated to a final moisture content above 8.5% or below 6.5%. The agglomerates final moisture contents between 7.5 and 8.5% were found to not flood.

A raffinate addition of between 39 and 44 L per tonne of residues resulted in an agglomerate of good quality for these particular heap leach residues, which have starting moisture contents between 4.6 and 5.3% before agglomeration.

The tests discussed in Examples 8 to 10 demonstrated that acid addition does not influence the permeability of the agglomerate. Agglomerated residues may be stacked to a height of 8 m and are permeable to forced aeration. It may be desirable to irrigate the stacked agglomerates at an initial irrigation rate of less than 10 L/m²·h to reduce the chance of plugging and flooding. Once percolation is taking place throughout the pile, the irrigation rates may be increased to 10 L/m²·h or higher. Once at steady state, the solution holdup volume in the tested agglomerates is approximately 9.4% irrespective of the starting moisture or the irrigation rate.

In the above-described embodiments, a process for extracting copper is described. The present application is not limited to copper, however as other metals may be extracted.

According to embodiments, heap leach residues are blended with additional material to provide a blend having a fines content that is equal to or less than a predetermined value, and metal such as gold, nickel, zinc, and uranium are leached from the blend.

In the preceding description, for purposes of explanation, numerous details are set forth in order to provide a thorough understanding of the embodiments of the application. However, it will be apparent to one skilled in the art that these specific details are not required in order to practice the application.

The above-described embodiments of the application are intended to be examples only. Alterations, modifications and variations can be effected to the particular embodiments by those of skill in the art without departing from the scope of the application, which is defined solely by the claims appended hereto.

What is claimed is:

1. A process for recovering copper from a copper sulphide ore extracted from a mine and previously leached in a heap to provide heap leach residues, the process comprising:
   treating the heap leach residues to provide treated heap leach residues having a permeability to air at least an order of magnitude greater than the permeability to air of a heap of untreated heap leach residue, when permeability is measured in Darcy units, the treated heap leach residues providing improved permeability of a heap of the treated heap leach residues; and leaching the heap of the treated heap leach residues with a leaching solution;

wherein treating the heap leach residues comprises blending the heap leach residues with additional unleached material from the mine, the additional unleached material comprising at least one of: crushed ore, run-of-mine ore, low grade ore, marginal ore or waste rock, wherein the additional unleached material is obtained from a hypogene ore body or supergene ore body and has a copper content below a cutoff grade of the mine, to provide a blend of previously heap-leached copper sulphide ore and the additional unleached material from the mine, the blend comprising more than about 50% and less than about 100% of the previously heap-leached copper sulphide ore.

2. The process according to claim 1, wherein the heap of the treated heap leach residue has a permeability to air about two orders of magnitude greater than the permeability to air of a heap of untreated heap leach residue, when permeability is measured in Darcy units.

3. The process according to claim 1, wherein treating the heap leach residues comprises blending the heap leach residues with at least one of: crushed ore, run-of-mine ore, low grade ore, marginal ore or waste rock, to provide a blend and the blend has a fines content of less than 32 weight %.

4. The process according to claim 1, wherein treating the heap leach residues comprises blending the heap leach residues with at least one of: crushed ore, run-of-mine ore, low grade ore, marginal ore or waste rock, to provide a blend and the blend has a fines content of less than 25 weight %.

5. The process according to claim 1, wherein treating the heap leach residues comprises blending the heap leach residues with at least one of: crushed ore, run-of-mine ore, low grade ore, marginal ore or waste rock, to provide a blend and the blend has a fines content of less than 15 weight %.

6. The process according to claim 3, wherein the fines comprise particles that measure 150 μm or less.

7. The process according to claim 3, wherein the process comprises blending the heap leach residues with crushed ore, and the process further comprises crushing ore to provide the crushed ore before blending the crushed ore with the heap leach residues.

8. The process according to claim 3, wherein the at least one of crushed ore, run-of-mine ore, low grade ore, marginal ore or waste rock comprises a copper ore.

9. The process according to claim 3, wherein the at least one of crushed ore, run-of-mine ore, low grade ore, marginal ore or waste rock comprises at least crushed ore.

10. The process according to claim 3, wherein the at least one of crushed ore, run-of-mine ore, low grade ore, marginal ore or waste rock comprises primary, secondary, or mixtures of primary and secondary sulphides of copper.

11. The process according to claim 10, wherein the primary sulphides of copper are mined from a hypogene ore body and comprise chalcopyrite ($CuFeS_2$) and bornite ($Cu_5FeS_4$).

12. The process according to claim 10, wherein the secondary sulphides of copper are mined from a supergene ore body and comprise chalcocite ($Cu_2S$) and covellite (CuS).

13. The process according to claim 1, wherein the heap leach residues are obtained from leaching primary, secondary, or mixtures of primary and secondary sulphides of copper.

14. The process according to claim 13, wherein the primary sulphides of copper are mined from a hypogene ore body and comprise chalcopyrite ($CuFeS_2$) and bornite ($Cu_5FeS_4$).

15. The process according to claim 13, wherein the secondary sulphides of copper are mined from a supergene ore body and comprise chalcocite ($Cu_2S$) and covellite (CuS).

16. The process according to claim 1, wherein the blending comprises:
removing the heap leach residues from a pad or reclaiming the heap leach residues from a dump;
blending the heap leach residues with the at least one of crushed ore, run-of-mine ore, low grade ore, marginal ore or waste rock to provide the blend; and
depositing the blend for leaching.

17. The process according to claim 1, wherein the process further comprises agglomerating the heap leach residues, and the blending and agglomerating comprises:
removing the heap leach residues from a pad or reclaiming the heap leach residues from a dump;
blending the heap leach residues with the at least one of crushed ore, run-of-mine ore, low grade ore, marginal ore or waste rock to provide the blend;
agglomerating the blend; and
depositing the agglomerated blend for leaching.

18. The process according to claim 1, wherein the process further comprises agglomerating the heap leach residues, and the blending and agglomerating comprises:
removing the heap leach residues from a pad or reclaiming the heap leach residues from a dump;
agglomerating the heap leach residues;
blending the agglomerated heap leach residues with the at least one of crushed ore, run-of-mine ore, low grade ore, marginal ore or waste rock to provide a blend; and
depositing the blend for leaching.

19. The process according to claim 1, wherein leaching comprises heap leaching or dump leaching.

20. The process according to claim 1, wherein leaching comprises heap leaching and includes forced aeration of the heap blend.

21. The process according to claim 20, wherein the forced aeration has an aeration rate of between 0.2 and 3.0 $m^3/m^2 \cdot hour$.

22. The process according to claim 1, wherein leaching comprises dump leaching at an irrigation rate between 0.1 and 5.0 $L/m^3 \cdot h$.

23. The process according to claim 1, wherein leaching comprises heap leaching at an irrigation rate between 0.5 and 5.0 $L/m^3 \cdot h$.

24. The process according to claim 1, wherein leaching comprises dump leaching at an irrigation rate between 0.1 and 3.0 $L/m^3 \cdot h$.

25. The process according to claim 1, wherein the leaching solution has a sulphuric acid concentration of between 3.0 and 10.0 g/L.

26. The process according to claim 1, wherein the leaching comprises heap leaching at an initial irrigation rate of less than about 10 $L/m^2 \cdot hour$ at least until solution breakthrough is observed.

27. The process according to claim 26, wherein the irrigation rate is increased from the initial irrigation rate to a subsequent irrigation rate between about 10 and about 76 $L/m^2 \cdot hour$.

28. The process according to claim 17, wherein agglomerating comprises adding acid, water or both acid and water to the blend and passing the blend through a rotating drum with internal lifters.

29. The process according to claim 18, wherein agglomerating comprises adding acid, water or both acid and water to the heap leach residues and passing the heap leach residues through a rotating drum with internal lifters.

30. The process according to claim 17, wherein the agglomerated blend has a moisture content of between about 6.5 and about 8.5% by weight of moisture.

31. The process according to claim 30 wherein the agglomerated residues have a moisture content of between about 7.5 and about 8.5% by weight of moisture.

32. The process according to claim 18, wherein the agglomerated residues have a moisture content of between about 6.5 and about 8.5% by weight of moisture.

33. The process according to claim 32 wherein the agglomerated residues have a moisture content of between about 7.5 and about 8.5% by weight of moisture.

34. The process according to claim 17, wherein the agglomerated blend has a moisture content selected such that the permeability of the heap is above about 5000 Darcy.

35. The process according to claim 18, wherein the agglomerated residues have a moisture content selected such that the permeability of the heap is above about 5000 Darcy.

36. The process according to claim 1, wherein the blending comprises blending with crushed ore to provide a blend of less than about 50% crushed ore.

37. A process for extracting a metal from a copper sulphide ore extracted from a mine and previously leached in a heap to provide heap leach residues, the process comprising:

treating the heap leach residues to provide treated heap leach residues, the treated heap leach residues providing improved permeability to air of a heap of the treated heap leach residues which is at least an order of magnitude greater than the permeability to air of a heap of untreated heap leach residue, when permeability is measured in Darcy units; and leaching the heap of the treated heap leach residues with a leaching solution;

wherein treating the heap leach residues comprises blending the heap leach residues with additional unleached material from the mine, the additional unleached material comprising at least one of crushed ore, run-of-mine ore, low grade ore, marginal ore or waste rock, wherein the additional unleached material is obtained from a hypogene ore body or supergene ore body and has a copper content below a cutoff grade of the mine, to provide a blend of previously heap-leached copper sulphide ore and the additional unleached material from the mine, the blend comprising more than about 50% and less than about 100% of the previously heap-leached copper sulphide ore.

38. The process according to claim 37, wherein the metal comprises at least one of copper, gold, nickel, zinc or uranium.

39. The process according to claim 37, wherein the blending comprises blending with crushed ore to provide a blend of less than about 50% crushed ore.

* * * * *